US012391362B2

(12) United States Patent
Shenouda

(10) Patent No.: US 12,391,362 B2
(45) Date of Patent: Aug. 19, 2025

(54) SYSTEM AND METHOD FOR MEASURING AN AXIAL POSITION OF A ROTATING COMPONENT

(71) Applicant: PRATT & WHITNEY CANADA CORP., Longueuil (CA)

(72) Inventor: Antwan Shenouda, Missisauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/135,968

(22) Filed: Apr. 18, 2023

(65) Prior Publication Data
US 2024/0351679 A1 Oct. 24, 2024

(51) Int. Cl.
*B64C 11/30* (2006.01)
*B64D 45/00* (2006.01)
(Continued)

(52) U.S. Cl.
CPC ............ *B64C 11/301* (2013.01); *B64D 45/00* (2013.01); *B64D 45/0005* (2013.01); *F01D 17/02* (2013.01); *F01D 17/06* (2013.01); *F01D 17/24* (2013.01); *F01D 21/003* (2013.01); *F01D 21/14* (2013.01); *G01B 7/023* (2013.01);
(Continued)

(58) Field of Classification Search
CPC . F01D 7/00; F01D 17/02; F01D 17/06; F01D 17/20; F01D 17/24; F01D 21/003; F01D 21/14; F05D 2270/80; F05D 2270/821; B64C 11/34; B64C 11/301; B64C 11/44; B64C 11/305; B64C 11/40;
(Continued)

(56) References Cited

U.S. PATENT DOCUMENTS

| 4,602,515 A | 7/1986 | Echenlaub |
| 8,692,543 B2 | 4/2014 | Exposito et al. |

(Continued)

FOREIGN PATENT DOCUMENTS

| EP | 2431715 A1 | 3/2012 |
| EP | 3828492 A1 | 6/2020 |
| EP | 3838745 A1 | 6/2021 |

OTHER PUBLICATIONS

European Patent Office, Communication re. extended European search report for European patent application No. 24170890.8, Sep. 9, 2024.

*Primary Examiner* — Christopher Verdier
(74) *Attorney, Agent, or Firm* — Norton Rose Fulbright Canada LLP

(57) ABSTRACT

Systems and methods for measuring an axial position of a phonic wheel or other rotating component are provided. The system includes a phonic wheel rotatable about a rotation axis and translatable along the rotation axis, a first sensor, a second sensor and a computer. The phonic wheel includes an inclined tooth having an axially non-uniform radial height and a reference tooth having an axially uniform radial height. The first sensor generates a positioning signal indicative of a gap between the inclined tooth and the first sensor. The second sensor generates a reference signal indicative of a gap between the reference tooth and the reference sensor. The first and second sensors have different orientations. The computer generates an output indicative of the axial position of the phonic wheel based on the positioning signal and the reference signal.

20 Claims, 10 Drawing Sheets

(51) Int. Cl.
  *F01D 7/00*    (2006.01)
  *F01D 17/02*   (2006.01)
  *F01D 17/06*   (2006.01)
  *F01D 17/24*   (2006.01)
  *F01D 21/00*   (2006.01)
  *F01D 21/14*   (2006.01)
  *G01B 7/02*    (2006.01)
  *G01B 7/30*    (2006.01)

(52) U.S. Cl.
  CPC ................ *G01B 7/30* (2013.01); *F01D 7/00* (2013.01); *F05D 2270/821* (2013.01)

(58) Field of Classification Search
  CPC .... B64D 45/00; B64D 45/0005; G01B 7/023; G01B 7/30
  See application file for complete search history.

(56) References Cited

U.S. PATENT DOCUMENTS

| | | |
|---|---|---|
| 11,420,772 B2 | 8/2022 | Tomescu et al. |
| 11,428,116 B2 | 8/2022 | Shenouda et al. |
| 2015/0139798 A1 | 5/2015 | Duke et al. |
| 2018/0304991 A1 | 10/2018 | Kudma et al. |
| 2021/0114716 A1* | 4/2021 | Yakobov ................ G01B 7/003 |

* cited by examiner

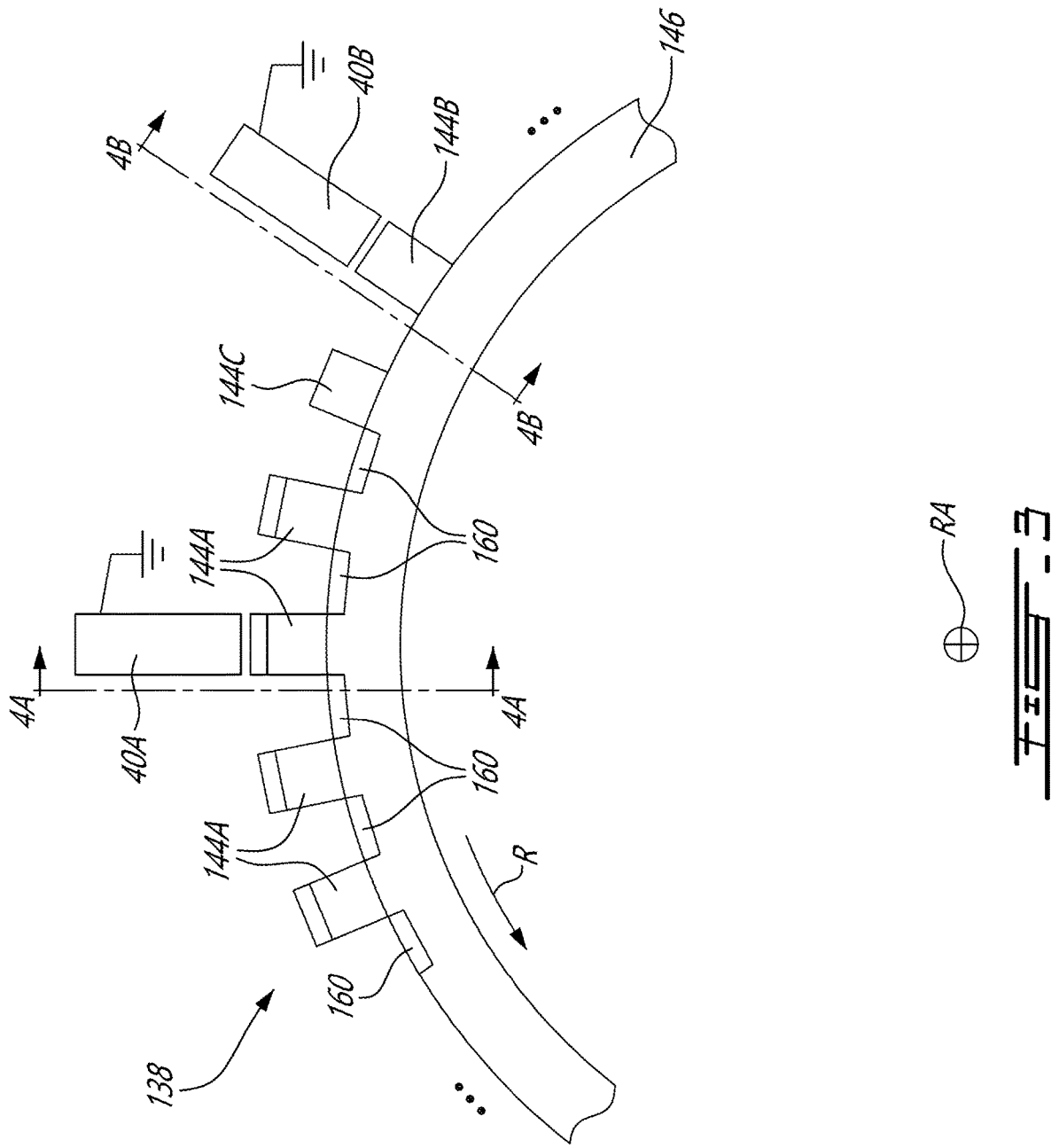

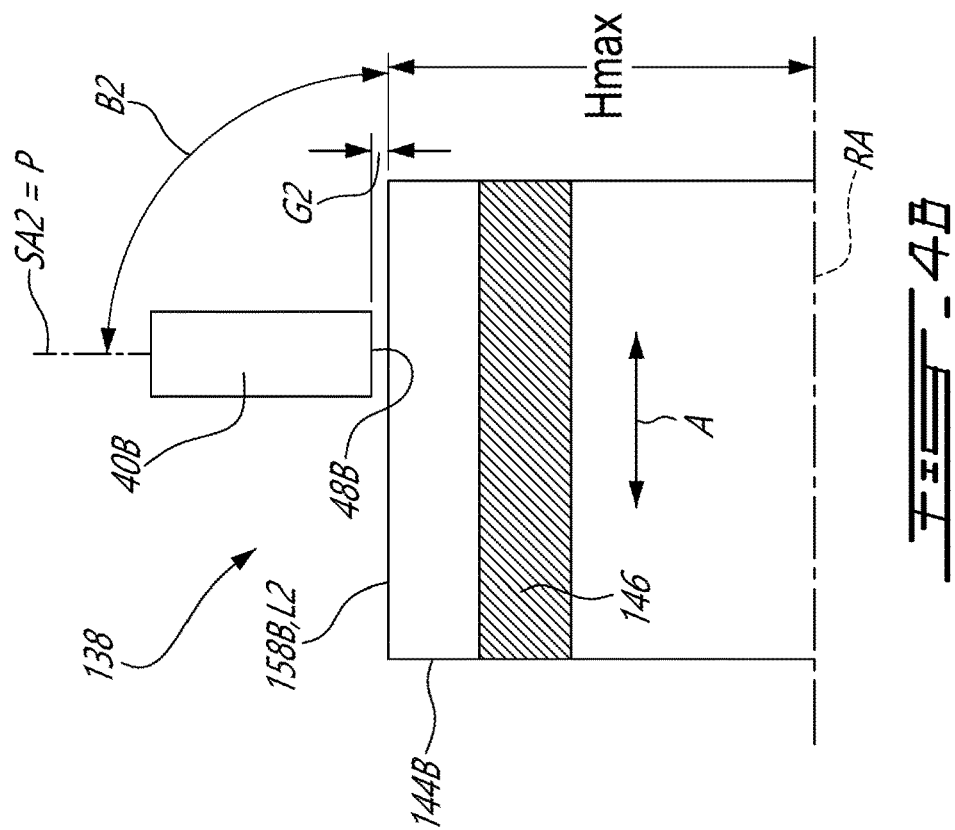
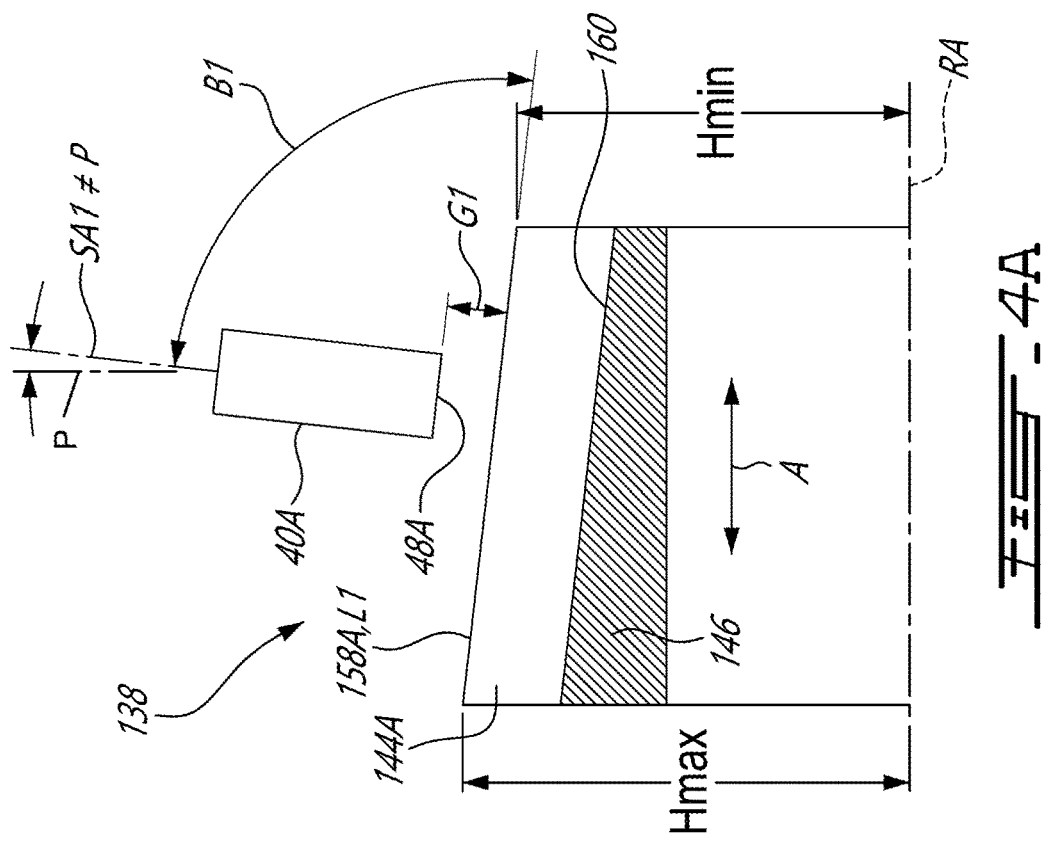
FIG. 4B
FIG. 4A

| AIR GAP $G1$ (mm) | AXIAL POSITION $54$ (mm) | PITCH ANGLE $52$ (deg) |
|---|---|---|
| GAP1 | A1 | P1 |
| GAP2 | A2 | P2 |
| GAP3 | A3 | P3 |
| GAP4 | A4 | P4 |
| GAP5 | A5 | P5 |
| GAP6 | A6 | P6 |

FIG. 9

SYSTEM AND METHOD FOR MEASURING AN AXIAL POSITION OF A ROTATING COMPONENT

TECHNICAL FIELD

The disclosure relates generally to measuring an axial position of a rotating component such as a phonic wheel of a feedback system for pitch-adjustable blades of bladed rotors of aircraft.

BACKGROUND

On aircraft propeller systems that have pitch-adjustable (i.e., variable pitch) propeller blades, it is desirable to provide accurate feedback on the angular position, sometimes referred to as "beta angle", of the propeller blades. Such feedback can be used to control the angular position in a feedback control loop based on a requested set point. The angular position feedback can also be used to ensure that the propeller is not inadvertently commanded to transition into excessively low or reverse beta angles. Due to the limited space available on aircraft engines, providing systems that can accurately and reliably provide positional feedback of the propeller blades is challenging.

SUMMARY

In one aspect, the disclosure describes a system for measuring an axial position of a phonic wheel. The system comprises:
the phonic wheel rotatable about a rotation axis and translatable along the rotation axis, the phonic wheel including:
a body;
an inclined tooth attached to the body and extending axially, a top surface of the inclined tooth being inclined relative to the rotation axis; and
a reference tooth attached to the body and extending axially, a top surface of the reference tooth being parallel to the rotation axis;
an inclined sensor adjacent the phonic wheel and configured to generate a positioning signal indicative of a gap between the top surface of the inclined tooth and the inclined sensor along a sensor axis of the inclined sensor as the phonic wheel is rotated relative to the inclined sensor, the sensor axis of the inclined sensor being non-perpendicular to the rotation axis;
a reference sensor adjacent the phonic wheel and configured to generate a reference signal indicative of a gap between the top surface of the reference tooth and the reference sensor along a sensor axis of the reference sensor as the phonic wheel is rotated relative to the reference sensor, the sensor axis of the reference sensor being perpendicular to the rotation axis; and
a computer operatively connected to the inclined sensor and to the reference sensor, the computer being configured to generate an output indicative of the axial position of the phonic wheel based on the positioning signal and the reference signal.

In another aspect, the disclosure describes an aircraft engine comprising:
a bladed rotor rotatable about a rotation axis and having pitch-adjustable blades;
a toothed ring coaxial with the rotation axis, the toothed ring including:
an inclined tooth extending axially relative to the rotation axis and having an axially non-uniform radial height; and
a reference tooth extending axially relative to the rotation axis and having an axially uniform radial height;
an inclined sensor adjacent to the toothed ring, the inclined sensor or the toothed ring being rotatable about the rotation axis and translatable axially along the rotation axis as a function of a pitch angle of the pitch-adjustable blades, the inclined sensor being configured to generate a positioning signal indicative of a gap between the inclined tooth and the inclined sensor along a sensor axis of the inclined sensor as relative rotation between the toothed ring and the inclined sensor occurs, the sensor axis of the inclined sensor being perpendicular to a top surface of the inclined tooth;
a reference sensor fixedly mounted relative to the inclined sensor and adjacent to the toothed ring, the reference sensor being configured to generate a reference signal indicative of a gap between the reference tooth and the reference sensor along a sensor axis of the reference sensor as relative rotation between the toothed ring and the reference sensor occurs, the sensor axis of the reference sensor being perpendicular to the rotation axis; and
a computer operatively connected to the inclined sensor and to the reference sensor, the computer being configured to generate an output indicative of a relative axial position between the toothed ring and the inclined sensor based on the positioning signal and the reference signal.

In a further aspect, the disclosure describes a method for measuring an axial position of a phonic wheel. The method comprises:
directing a first magnetic field from a first sensor toward a location that a first tooth of the phonic wheel is expected to occupy as the phonic wheel rotates about a rotation axis relative to the first sensor, the first tooth extending axially relative to the rotation axis and having an axially non-uniform radial height, the first sensor being inclined relative to an orientation perpendicular to the rotation axis;
detecting a variation in the first magnetic field caused by movement of the first tooth in the first magnetic field;
generating a first feedback signal based on the detection of the variation in the first magnetic field;
directing a second magnetic field from a second sensor toward a location that a second tooth of the phonic wheel is expected to occupy as the phonic wheel rotates relative to the second sensor about the rotation axis, the second tooth extending axially relative to the rotation axis and having an axially uniform radial height;
detecting a variation in the second magnetic field caused by movement of the second tooth in the second magnetic field;
generating a second feedback signal based on the detection of the variation in the second magnetic field; and
generating an output indicative of the axial position of the phonic wheel based on the first feedback signal and the second signal.

Further details of these and other aspects of the subject matter of this application will be apparent from the detailed description included below and the drawings.

DESCRIPTION OF THE DRAWINGS

Reference is now made to the accompanying drawings, in which:

FIG. 3 is a partial schematic representation of another exemplary phonic wheel that may be part of the system of FIG. 2;

FIG. 4A is a partial schematic cross-section view of the phonic wheel of FIG. 3 taken along line 4A-4A in FIG. 3;

FIG. 4B is a partial schematic cross-section view of the phonic wheel of FIG. 3 taken along line 4B-4B in FIG. 3;

FIG. 9 is a table defining a relationship between the air gap, an axial position of the phonic wheel and a pitch angle of a bladed rotor.

DETAILED DESCRIPTION

The following description relates to phonic wheels and related systems and methods useful for measuring an axial position of a phonic wheel or of a component connected to the phonic wheel. In some embodiments, the phonic wheel may have an inclined tooth having an axially non-uniform radial height and one or more reference teeth having axially uniform radial heights. The presence of the inclined tooth may be sensed using a first sensor and the presence of the reference tooth (or teeth) may be sensed using a second sensor. The first sensor and the second sensor may have different orientations tailored for the inclined tooth and for the reference tooth (or teeth) respectively. In some embodiments, the use of the one or more reference teeth may reduce the need for calibration of the system. In some embodiments, the use of differently-orientated sensors for detecting the inclined tooth and the reference tooth (or teeth) respectively may improve compatibility between signals obtained from the different sensors and may improve accuracy in measuring the axial position of the phonic wheel or other rotating component.

The phonic wheels, systems and methods described herein may be useful in providing feedback on the angular position (i.e., pitch angle) of pitch-adjustable blades on aircraft bladed rotors such as aircraft propellers for example. However, the phonic wheels, systems and methods disclosed herein may also be used in other applications.

The terms "perpendicular" and "parallel" as used herein may permissibly include variations from purely perpendicular and parallel such as variations associated with dimensional tolerances of components and assemblies.

The term "substantially" as used herein may be applied to modify any quantitative representation which could permissibly vary without resulting in a change in the basic function to which it is related.

The terms "connected" and "attached" may include both direct connection and attachment (in which two elements contact each other) and indirect connection and attachment (in which at least one additional element is located between the two elements).

Aspects of various embodiments are described through reference to the drawings.

Figure 1:
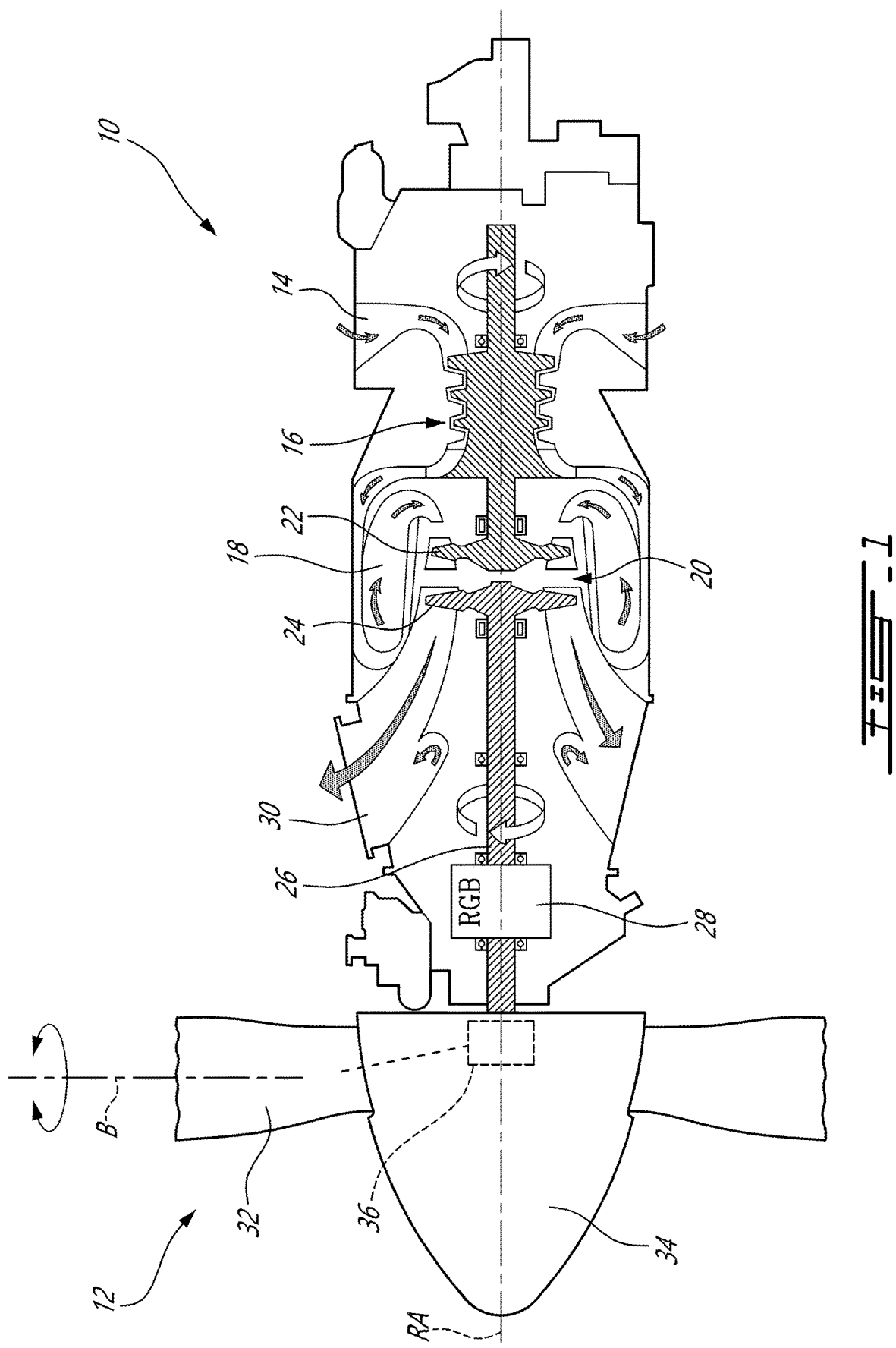
FIG. 1 is an axial cross-section view of an aircraft engine coupled to a bladed rotor with pitch-adjustable blades and including a system for measuring an axial position of a rotating component as described herein.

FIG. 1 is an axial cross-section view of an exemplary aircraft engine 10 coupled to bladed rotor 12 (e.g., propeller) for an aircraft. Engine 10 may be a gas turbine engine of a type typically provided for use in subsonic flight, including inlet 14, into which ambient air is received, (e.g., multi-stage) compressor 16 for pressurizing the air, combustor 18 in which the compressed air is mixed with fuel and ignited for generating an annular stream of hot combustion gases, and turbine section 20 for extracting energy from the combustion gases. Turbine section 20 may include high-pressure turbine 22, which may drive compressor 16 and other accessories, and power turbine 24 which may rotate separately from high-pressure turbine 22 and which may drive power shaft 26, which may be drivingly coupled to bladed rotor 12 via reduction gearbox 28. Combustion gases may be evacuated through exhaust duct 30 after passing through turbine section 20.

Bladed rotor 12 may include a plurality of pitch-adjustable blades 32 extending radially from hub 34 and being circumferentially distributed relative to hub 34 of bladed rotor 12. Each pitch-adjustable blade 32 may be angularly adjustable about a respective axis B. Accordingly, each blade 32 may be rotatable about axis B using any suitable mechanism so that the pitch of blades 32 may be adjusted collectively in unison for different phases of operation (e.g., feather, forward thrust and reverse thrust) of engine 10 and/or of an aircraft to which engine 10 and bladed rotor 12 may be mounted. Even though FIG. 1 illustrates bladed rotor 12 as a propeller suitable for fixed-wing aircraft, it is understood that aspects of this disclosure are also applicable to other types of bladed rotors such as a main rotor of a rotary-wing aircraft (e.g., helicopter) for example.

Bladed rotor 12 may be mounted for rotation about rotation axis RA. In some embodiments, rotation axis RA may, but not necessarily, be coaxial with an axis of rotation of power shaft 26. FIG. 1 also schematically shows system 36 for measuring an axial position of a rotating component (e.g., phonic wheel 38 shown in FIG. 2) which may be associated with bladed rotor 12. As explained further below the axial position of the rotating component may be indicative of the pitch angle (sometimes called beta angle) of pitch-adjustable blades 32 and may be used as a feedback signal for controlling the pitch angle of blades 32.

Figure 2:
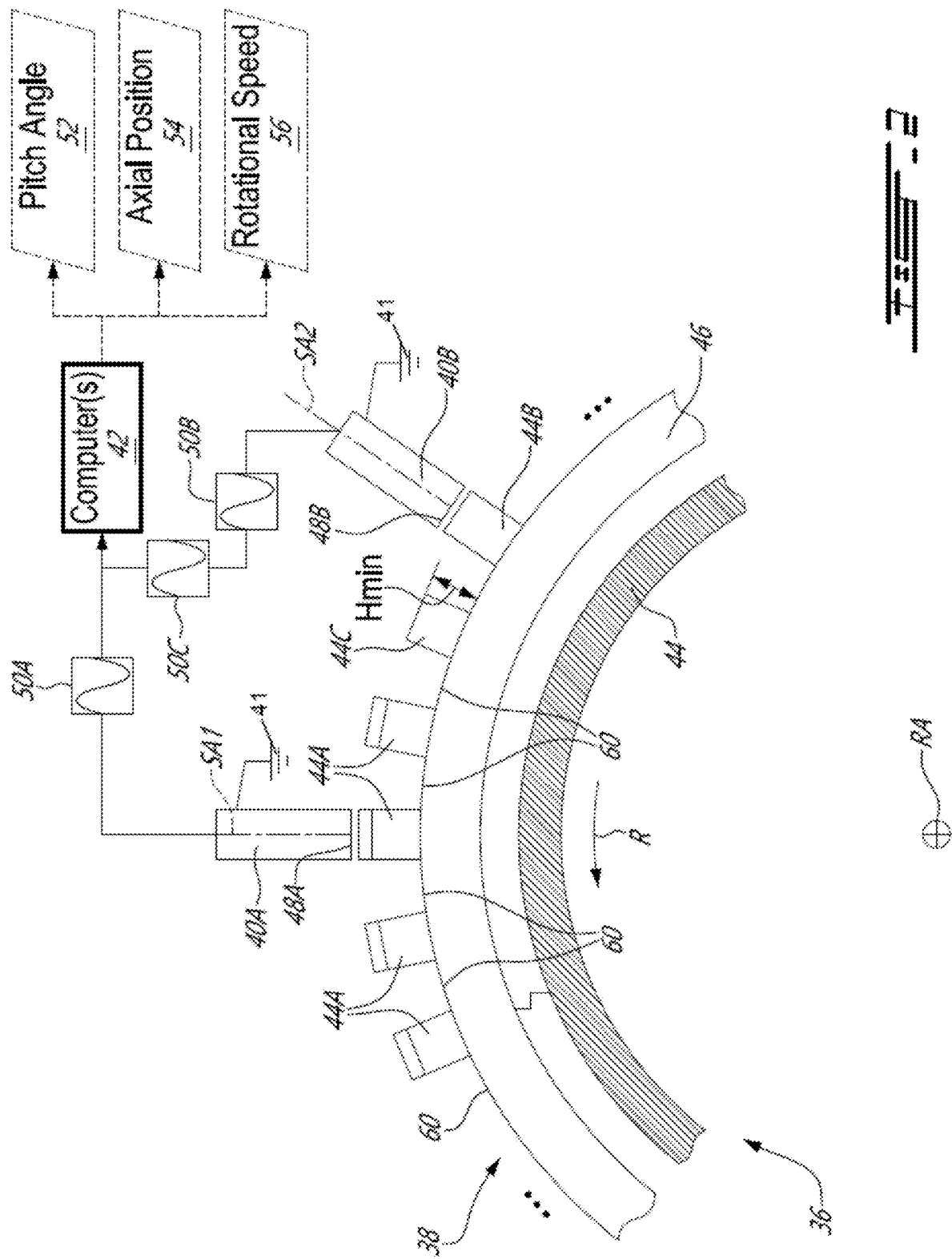
FIGS. 2, 2A and 2B show a schematic representation of an exemplary system including a phonic wheel for measuring an axial position of a rotating component.

FIG. 2 is a schematic representation of system 36 for measuring an axial position of a rotating component viewed along rotation axis RA. In some embodiments, system 36 may provide feedback indicative of pitch angle 52 of pitch-adjustable blades 32 of bladed rotor 12. System 36 may be configured to interface with known or other adjustable blade systems to permit the detection of pitch angle 52 of blades 32. In some embodiments, system 36 may include phonic wheel 38 (or phonic wheel 138 of FIG. 3), sensors 40A, 40B and a detection unit such as computer 42 for example.

In some embodiments, phonic wheel 38 may be connected for common rotation (e.g., torque transmission) and axial translation with another component such as shaft 44.

Phonic wheel 38 and shaft 44 (both of which being partially shown in FIG. 2) may be rotatable about rotation axis RA in the direction of arrow R and may also be axially translatable along rotation axis RA. Sensors 40A, 40B may be mounted to fixed structure 41 and be adjacent to phonic wheel 38. In other words, sensors 40A, 40B may be fixed relative to rotating and translating phonic wheel 38.

Alternatively, phonic wheel 38 could instead be used as a fixed toothed ring that is not rotatable about rotation axis RA. For example, in some embodiments, sensors 40A, 40B may be mounted to shaft 44 for rotation about rotation axis RA in the direction of arrow R and also be axially translatable along rotation axis RA. In other words, sensors 40A, 40B may be rotatable and translatable relative to stationary phonic wheel 38. In various embodiments, relative rotation and translation between phonic wheel 38 and sensors 40A, 40B may be achieved by having phonic wheel 38 rotatable and translatable relative to sensors 40A, 40B, or by having sensors 40A, 40B rotatable and translatable relative to phonic wheel 38.

In reference to FIG. 2, phonic wheel 38 may be configured to rotate with (e.g., be mechanically coupled to) bladed rotor 12 about rotation axis RA. For example, in some embodiments, phonic wheel 38 may be configured to rotate at the same rotational speed and be coaxial with bladed rotor 12. However, the rotation axis of phonic wheel 38 may not necessarily be coaxial with rotation axis RA of bladed rotor 12. Phonic wheel 38 may be axially displaceable along rotation axis RA to a plurality of axial positions as a function of the pitch angle of blades 32. Accordingly, an axial position of phonic wheel 38 may correspond to a pitch angle of blades 32. In some embodiments, phonic wheel 38 may be operatively (e.g., mechanically) coupled to bladed rotor 12 as described in US Patent Publication No. 2015/0139798 A1 (title: SYSTEM AND METHOD FOR ELECTRONIC PROPELLER BLADE ANGLE POSITION FEEDBACK), which is incorporated herein by reference.

Phonic wheel 38 may include circumferentially-spaced apart teeth 44A-44C useful for detecting the axial position of phonic wheel 38 as phonic wheel 38 and bladed rotor 12 rotate. Phonic wheel 38 may consequently be useful for detecting pitch angle 52 of adjustable blades 32 by way of a correlation. Phonic wheel 38 may include (e.g., annular) body 46 (e.g., ring) with teeth 44A-44C attached thereto and protruding radially therefrom. In some embodiments, teeth 44A-44C and sensors 40A, 40B may be disposed radially outwardly of body 46. Alternatively, teeth 44A-44C and sensors 40A, 40B may be disposed radially inwardly of body 46 instead.

In various embodiments, teeth 44A-44C may be configured such that a passage of teeth 44A-44C can be detected by sensors 40A, 40B as phonic wheel 38 rotates about rotation axis RA. In some embodiments, one or more teeth 44A-44C may be separate components individually attached (e.g., fastened) to body 46 of phonic wheel 38. In some embodiments, one or more teeth 44A-44C may be integrally formed with annular body 46 so that phonic wheel 38 may have a unitary construction. Teeth 44A-44C may include one or more inclined teeth 44A and one or more reference teeth 44B, 44C. In some embodiments, phonic wheel 38 may include a plurality of inclined teeth 44A all having the same geometric configuration. Inclined teeth 44A and reference teeth 44B, 44C may have different geometric configurations.

Sensors 40A, 40B may be inductive (e.g., magnetic, proximity) sensors suitable for non-contact detection of the passage of teeth 44A-44C as phonic wheel 38 rotates about rotation axis RA. Sensors 40A, 40B may be mounted adjacent phonic wheel 38 and attached (e.g., fastened) to some stationary structure 41 of engine 10. In some embodiments, sensors 40A, 40B may be configured as Hall effect sensors. In some embodiments, sensors 40A, 40B may be configured as variable reluctance sensors (commonly called VR sensors) suitable for detecting the proximity of (e.g., ferrous) teeth 44A-44C. Sensors 40A, 40B may each be of a same type. In some embodiments, sensors 40A, 40B may each be of a type disclosed in US Patent Publication No. 2018/0304991 A1 (title: FEEDBACK SYSTEM FOR PITCH-ADJUSTABLE BLADES OF AIRCRAFT BLADED ROTOR), which is incorporated herein by reference. In some embodiments, sensors 40A, 40B may each be a variable reluctance speed sensor such as model number E58A25 sold under the trade name JAQUET. Sensors 40A, 40B may each include an iron core, an inductive coil and a permanent magnet housed in a sensor housing. In some embodiments, sensors 40A, 40B may be of a type known as passive or electromagnetic sensors which do not require an external power supply.

The passing of ferrous teeth 44A-44C by sensor faces 48A, 48B may cause a change in the magnetic field strength, resulting in an alternating current (AC) voltage being induced in the coil and output as sensor signals 50A-50C. The change in magnetic field strength may be caused by teeth 44A-44C intersecting the magnetic fields respectively generated and/or detected by sensors 40A, 40B as phonic wheel 38 rotates. For example, the passage of each tooth 44A-44C by the sensor faces 48A, 48B may cause a change in magnetic permeability within the magnetic fields generated by sensors 40A, 40B and consequently cause detectable sensor signals 50A-50C. The frequency of sensor signals 50A-50C may be proportional to rotational speed 56 of phonic wheel 38. In some embodiments, computer 42 may also determine rotational speed 56 of phonic wheel 38, 138 based on the frequency of one or more sensor signals 50A-50C. The amplitude of sensor signals 50A-50C may be dependent on (i.e., indicative of) rotational speed 56, the size of air gaps G1, G2 (shown in FIG. 4A, 4B), the geometry of teeth 44A-44C and magnetic properties of the material of phonic wheel 38 for example. Depending on the type of sensor(s) and phonic wheel arrangement, the magnetic field me be generated by the phonic wheel instead of the sensor(s).

Computer 42 may be operatively connected to sensors 40A, 40B for receiving one or more of sensor signals 50A-50C and configured to generate one or more outputs (e.g., signals) indicative of pitch angle 52 of adjustable blades 32, axial position 54 of phonic wheel 38 and/or rotation speed 56 of phonic wheel 38. In various embodiments, sensors 40A, 40B may be in wired or wireless communication with computer 42. In various embodiments, computer 42 may be part of a Full Authority Digital Engine Control (FADEC) which may, for example, include one or more digital computer(s) or other data processors, sometimes referred to as electronic engine controller(s) (EEC) and related accessories that control at least some aspects of performance of engine 10. Accordingly, computer 42 may include one or more computing devices including, but not limited to, a digital computer, a processor (e.g. a microprocessor), and a memory. In some embodiments, system 36 may be referred to as an "Np/beta" feedback system where Np represents rotational speed 56 of bladed rotor 12 and beta represents pitch angle 52 of blades 32. In some embodiments, computer 42 may perform other tasks associated with engine 10.

Figure 2B:
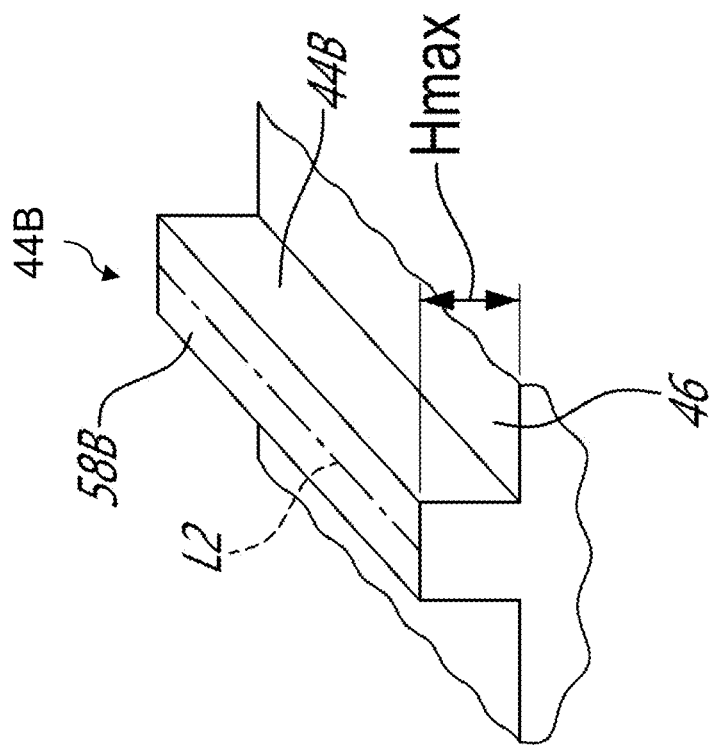
Figure 2A:
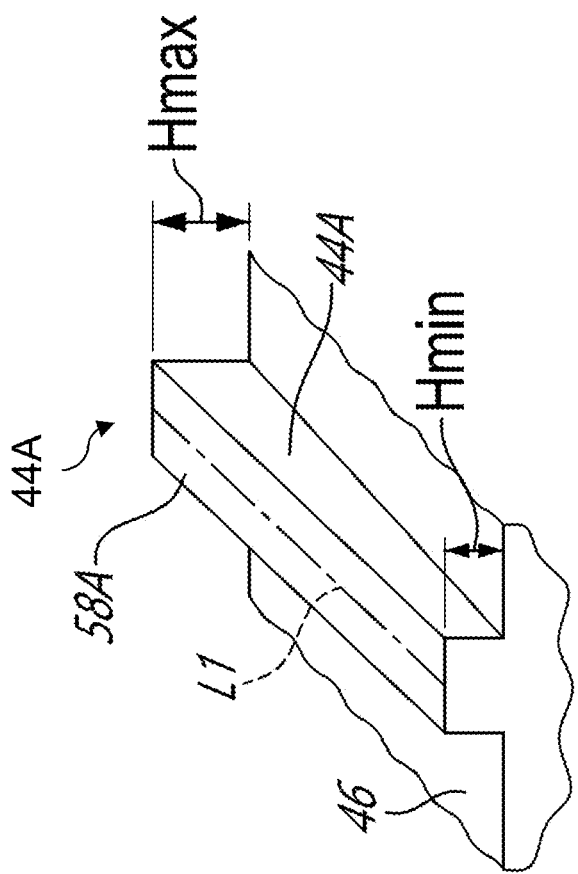

FIG. 2A shows an exemplary perspective view of inclined tooth 44A. Inclined tooth 44A may be attached to body 46 and may extend generally axially. Inclined tooth 44A may include top surface 58A facing radially outwardly from rotation axis RA. Inclined tooth 44A may have an axially non-uniform radial height from body 46 and/or from rotation axis RA so that inclined tooth 44A may have a first (e.g., minimum) radial height Hmin at a first axial position and a different second (e.g., maximum) radial height Hmax at a second axial position. In some embodiments, top surface 58A of inclined tooth 44A may be linearly sloped over an axial distance of inclined tooth 44A and top surface 58A may be planar. In some embodiments, line L1 extending axially and lying in a plane of top surface 58A of inclined tooth 44A may be inclined relative to rotation axis RA. Line L1 may also lie in a same plane as rotation axis RA. In other words, line L1 may lie in a plane that is parallel and coincident with rotation axis RA. In embodiments where top surface 58A is planar, line L1 may be a linear segment. In other embodiments where top surface 58A is non-linearly sloped over the axial distance and line L1 may be curved.

FIG. 2B shows an exemplary perspective view of reference tooth 44B. Reference tooth 44B may be attached to body 46 and may extend generally axially. Reference tooth 44B may include top surface 58B facing radially outwardly from rotation axis RA. Reference tooth 44B may have an axially uniform radial height corresponding to maximum radial height Hmax from body 46 and/or from rotation axis RA. Top surface 58B of reference tooth 44B may be planar. In some embodiments, line L2 extending axially and lying in a plane of top surface 58B of inclined tooth 44A may be parallel to rotation axis RA. Line L2 may lie in a same plane as rotation axis RA. In other words, line L2 may lie in a plane that is parallel and coincident with rotation axis RA. Line L2 may be a linear segment.

In some embodiments, reference tooth 44B may alternatively have an axially uniform radial height corresponding to minimum radial height Hmin from body 46 and/or from rotation axis RA. In some embodiments, reference tooth 44B may have an axially uniform radial height that is between minimum radial height Hmin and maximum radial height Hmax. In some embodiments, phonic wheel 38 may include two reference teeth 44B, 44C where reference tooth 44B has an axially uniform radial height corresponding to maximum radial height Hmax and reference tooth 44C has an axially uniform radial height corresponding to minimum radial height Hmin. Reference tooth 44C may have the same configuration as reference tooth 44B except for having a smaller axially uniform radial height Hmin. In various embodiments, phonic wheel 38 may include one or more inclined teeth 44A and one or more reference teeth 44B, 44C circumferentially distributed around body 46 of phonic wheel 38.

Phonic wheel 38 may define troughs 60 between adjacent inclined teeth 44A. The bottoms of troughs 60 may be respectively defined by a surface of body 46 adjacent inclined teeth 44A. In some embodiments, troughs 60 may be parallel to rotation axis RA so that inclined teeth 44A may have an axially non-uniform radial height from the surface of body 46.

FIG. 3 is a partial schematic representation of another exemplary phonic wheel 138 that may be part of system 36 instead of phonic wheel 38. Phonic wheel 138 may have elements in common with phonic wheel 38. Like elements have been identified with like reference numerals that have been incremented by 100. In contrast with phonic wheel 38, phonic wheel 138 may define troughs 160 between adjacent inclined teeth 144A. The bottoms of troughs 160 may be respectively defined by a surface of body 146 adjacent inclined teeth 144A. In some embodiments, troughs 160 may be axially inclined relative to rotation axis RA. In some embodiment, the inclination of troughs 160 may be the same as their adjacent inclined teeth 144A so that inclined teeth 144A may have an axially uniform radial height from the surface of body 146 but may have an axially non-uniform radial height from rotation axis RA.

In some embodiments, inclined troughs 160 may cause the same geometry of inclined tooth 144A to be presented to inclined sensor 40A at different relative axial positions even though gap G1 may change as a function of axial position. In some situations, presenting the same tooth geometry to inclined sensor 40A may further improve compatibility between positioning sensor signal 50A obtained from inclined sensor 40A from the passage of inclined tooth 144A and reference sensor signal(s) 50B and 50C obtained from reference sensor 40B from the passage of reference teeth 144B and 144C respectively.

FIG. 4A is a partial schematic cross-section view showing part of phonic wheel 138 of FIG. 3 above rotation axis RA taken along line 4A-4A in FIG. 3. The following explanation may also apply to phonic wheel 38. Phonic wheel 138 may be rotatable about rotation axis RA and axially translatable along rotation axis RA (e.g., see arrow A). Phonic wheel 138 may include one or more inclined teeth 144A having substantially identical geometries. Inclined tooth 144A shown may have top surface 158A having an axially non-uniform radial height from maximum radial height Hmax to minimum radial height Hmin from rotation axis RA. In some embodiments, minimum radial height Hmin of top surface 158A from rotation axis RA may correspond to a first axial position (e.g., displacement limit) for phonic wheel 138, and maximum radial height Hmax of top surface 158A from rotation axis RA may correspond to a second axial position (e.g., displacement limit) for phonic wheel 138. In some embodiments, the axial positions of maximum radial height Hmax and minimum radial height Hmin along rotation axis RA may define the range of axial travel of phonic wheel 138 during operation.

Inclined sensor 40A may be tilted so as to be non-perpendicular to rotation axis RA. Inclined sensor 40A may have sensor axis SA1 that may be inclined relative to orientation P perpendicular to rotation axis RA. In other words, sensor axis SA1 of inclined sensor 40A may be non-perpendicular to rotation axis RA. Sensor axis SA1 may be an orientation along which gap G1 between sensor face 48A and top surface 158A of tooth 144A is intended to be measured with inclined sensor 40A. For example, sensor axis SA1 may pass through a center of sensor face 48A and extend perpendicularly to sensor face 48A. In case of a variable reluctance sensor, sensor axis SA1 may correspond to an axis of symmetry of the magnetic field generated by the magnet of inclined sensor 40A without external influence. Sensor axis SA1 may correspond to a central axis about which the induction coil of inclined sensor 40A is wound. In some embodiments, sensor axis SA1 may correspond to a central/longitudinal axis of the magnet of inclined sensor 40A. In some embodiments, sensor axis SA1 may correspond to a central/longitudinal axis of a cylindrical housing of inclined sensor 40A.

The orientation of inclined sensor 40A may be based on the orientation of top surface 158A of inclined tooth 144A. For example, in situations where top surface 158A is linearly sloped, inclined sensor 40A may be oriented to be perpendicular to top surface 158A (and of line L1 shown in FIG.

2) so that angle B1 may be about 90 degrees. In some embodiments, the perpendicular orientation of inclined sensor 40A relative to top surface 158A may promote a uniform gap G1 across sensor face 48A and also promote symmetry of the magnetic field across sensor axis SA1 when the magnetic field generated by inclined sensor 40A is influenced by the presence of inclined tooth 44A. For example, a uniform gap G1 across sensor face 48A may reduce skewing of the magnetic field generated by inclined sensor 40A relative to sensor axis SA1. In situations where top surface 158A is non-linearly sloped, inclined sensor 40A may be oriented to be perpendicular to an average slope of top surface 158A for example.

In various embodiments, top surface 158A of inclined tooth 144A may be inclined relative to rotation axis RA. For example, in some embodiments, top surface 158A may be inclined by an angle of between 10 and 20 degrees relative to rotation axis RA. In some embodiments, inclined sensor 40A may be inclined/tilted by the same amount from orientation P perpendicular to rotation axis RA. The slope and permeability of teeth 44A-44C, 144A-144C may be selected such that at a low speed of phonic wheel 38, 138 and at maximum air gap G3 (shown in FIG. 8), the amplitude of sensor signal 50C is sufficient to produce a zero crossing and allow for an amplitude determination within a suitable accuracy.

During operation of system 36, phonic wheel 138 may rotate about rotation axis RA and may also axially translate along rotation axis RA. As phonic wheel 138 is translated relative to inclined sensor 40A, the size of air gap G1 may also vary. Inclined tooth 144A may be sloped axially such that axial translation of phonic wheel 138 causes a gradual change in air gap G1 between top surface 158A and sensor face 48A of inclined sensor 40A. This change in air gap G1 may in turn cause the amplitude of positioning sensor signal 50A (shown in FIG. 2) to also gradually vary as phonic wheel 138 is axially translated. The amplitude of positioning sensor signal 50A may therefore be representative of the axial position of phonic wheel 138. As shown in FIG. 4A, trough 160 may be axially sloped by the same amount so that inclined tooth 144A may have an axially uniform height from the surface of body 146.

FIG. 4B is a partial schematic cross-section view showing part of phonic wheel 138 of FIG. 3 above rotation axis RA taken along line 4B-4B in FIG. 3. The following explanation may also apply to phonic wheel 38. Phonic wheel 138 may include one or more reference teeth 144B, 144C. Reference tooth 144B shown may have top surface 158B having an axially uniform radial height from rotation axis RA at maximum height Hmax of inclined tooth 144A. In some embodiments, reference tooth 144C shown in FIG. 3 may be configured substantially identically to reference tooth 144B except for having a top surface disposed at an axially uniform radial height from rotation axis RA set to minimum height Hmin of inclined tooth 144A. Various embodiments of phonic wheel 138 may include reference tooth 144B, reference tooth 144C or both reference tooth 144B and reference tooth 144C. Reference sensor 40B may be fixedly mounted relative to inclined sensor 40A and may also be adjacent to phonic wheel 138. Sensor axis SA2 of reference sensor 40B may be perpendicular to rotation axis RA, to top surface 158B and also to line L2 so that angle B2 may be about 90 degrees.

During operation of system 36, as phonic wheel 138 is rotated and axially translated relative to reference sensor 40B, the size of air gap G2 may remain substantially constant. Reference sensor 40B may be configured to generate reference sensor signal 50B indicative of air gap G2 between top surface 158B of reference tooth 144B and reference sensor 40B along sensor axis SA2 of reference sensor 40B as relative rotation and translation between reference sensor 40B and reference tooth 144B occurs. In embodiments where both reference teeth 144B, 144C are present, the same reference sensor 40B may be used to provide reference sensor signal 50B associated with the presence of reference tooth 144B and reference sensor signal 50C (shown in FIG. 2) associated with the presence of reference tooth 144C as phonic wheel 138 rotates. Reference sensor signal 50C may be indicative of air gap G3 (shown in FIG. 8) between a top surface of reference tooth 144C and reference sensor 40B along sensor axis SA2 of reference sensor 40B.

Reference sensor signal(s) 50B, 50C may respectively define maximum and minimum signal amplitudes that can be expected at the maximum radial height Hmax and at the minimum radial height Hmin of inclined tooth 144A corresponding to axial travel boundaries of phonic wheel 138. Accordingly, positioning sensor signal 50A may be compared with reference sensor signal(s) 50B, 50C in order to interpolate an axial position of phonic wheel 138 between the axial travel boundaries. In some embodiments, reference sensor signal(s) 50B, 50C may be acquired at each revolution of phonic wheel 138. In some embodiments, positioning sensor signal 50A and reference sensor signal(s) 50B, 50C may be acquired during the same revolution of phonic wheel 138.

In some embodiments, inclined sensor 40A and reference sensor 40B may be substantially axially aligned so that inaccuracies introduced at the axial ends (also known as "edge effect") of teeth 44A-44C, 144A-144C may be taken in consideration in reference sensor signal(s) 50B, 50C. For example, a center of sensor face 48A of inclined sensor 40A may be axially aligned with a center of sensor face 48B of reference sensor 40B. In some embodiments, teeth 44A-44C, 144A-144C may be made to extend beyond the axial travel limits of phonic wheel 38, 138 to reduce or eliminate such edge effect.

Figure 5:
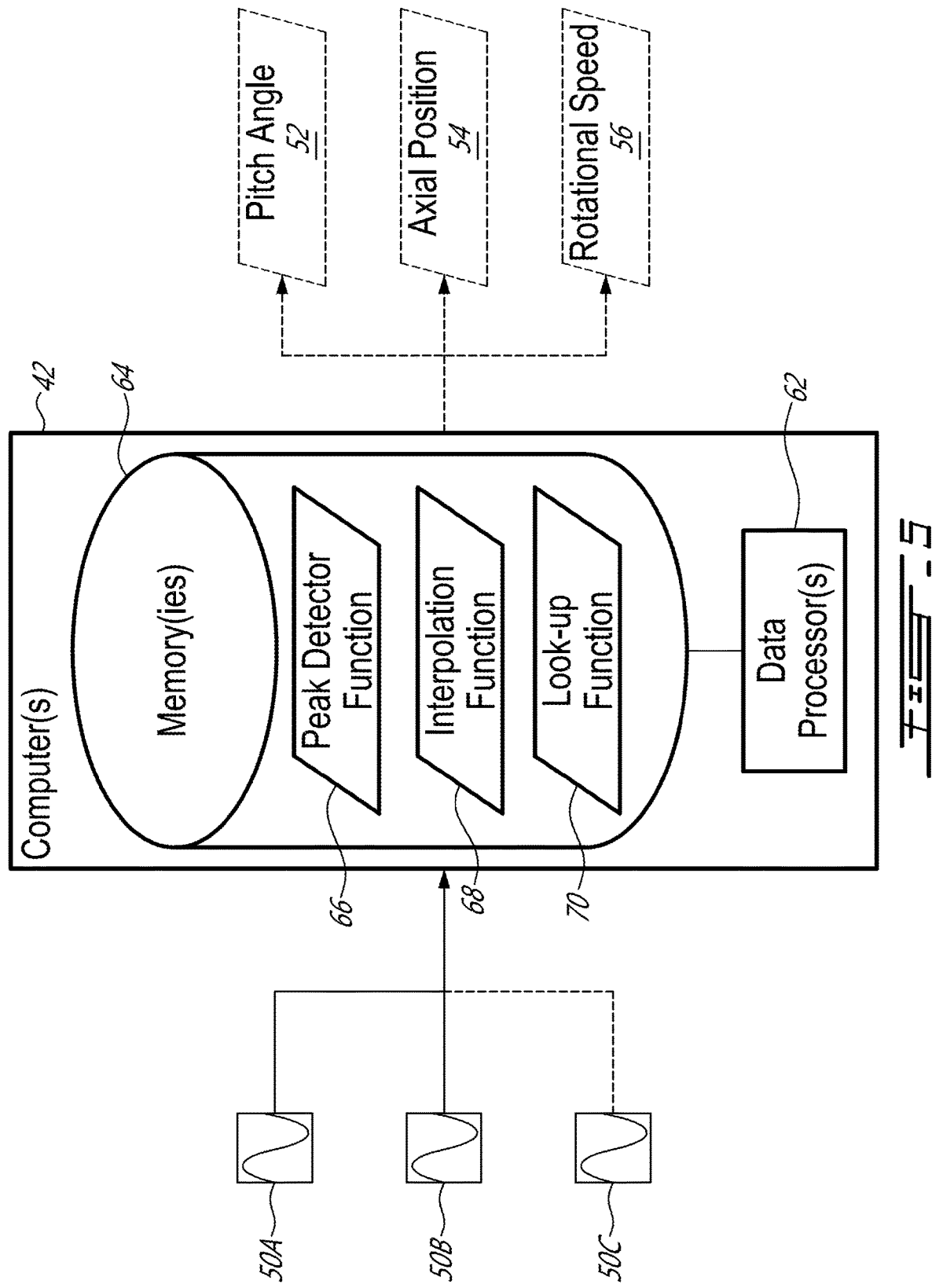
FIG. 5 is a schematic representation of an exemplary computer of the system of FIG. 2.

FIG. 5 is a schematic representation of an exemplary computer 42 of system 36. Computer 42 may include one or more data processors 62 (referred hereinafter as "processor 62") and non-transitory machine-readable memory 64. Computer 42 may be configured to regulate the operation of system 36 and optionally also control other aspects of operation of engine 10. Computer 42 may receive input(s) such as positioning sensor signal(s) 50A and reference sensor signal(s) 50B, 50C, perform one or more procedures or steps defined by instructions stored in memory 64 and executable by processor 62 to generate one or more outputs. Such output(s) may include a pitch angle 52 of blades 32, axial position 54 of phonic wheel 38, 138 and/or rotational speed 56 of phonic wheel 38, 138.

Processor 62 may include any suitable device(s) configured to cause a series of steps to be performed by computer 42 so as to implement a computer-implemented process such that instructions, when executed by computer 42 or other programmable apparatus, may cause the functions/acts specified in the methods described herein to be executed. Processor 62 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 64 may include any suitable machine-readable storage medium. Memory 64 may include non-transitory computer readable storage medium such as, for example, but not limited to, an electronic, magnetic, optical, electromagnetic, infrared, or semiconductor system, apparatus, or device, or any suitable combination of the foregoing. Memory 64 may include any storage means (e.g. devices) suitable for retrievably storing machine-readable instructions executable by processor 62. In some embodiment, memory 64 may store machine-readable instructions in the form of peak detection function 66, interpolation function 68 and look-up function 70, which are described further below.

Figure 6:
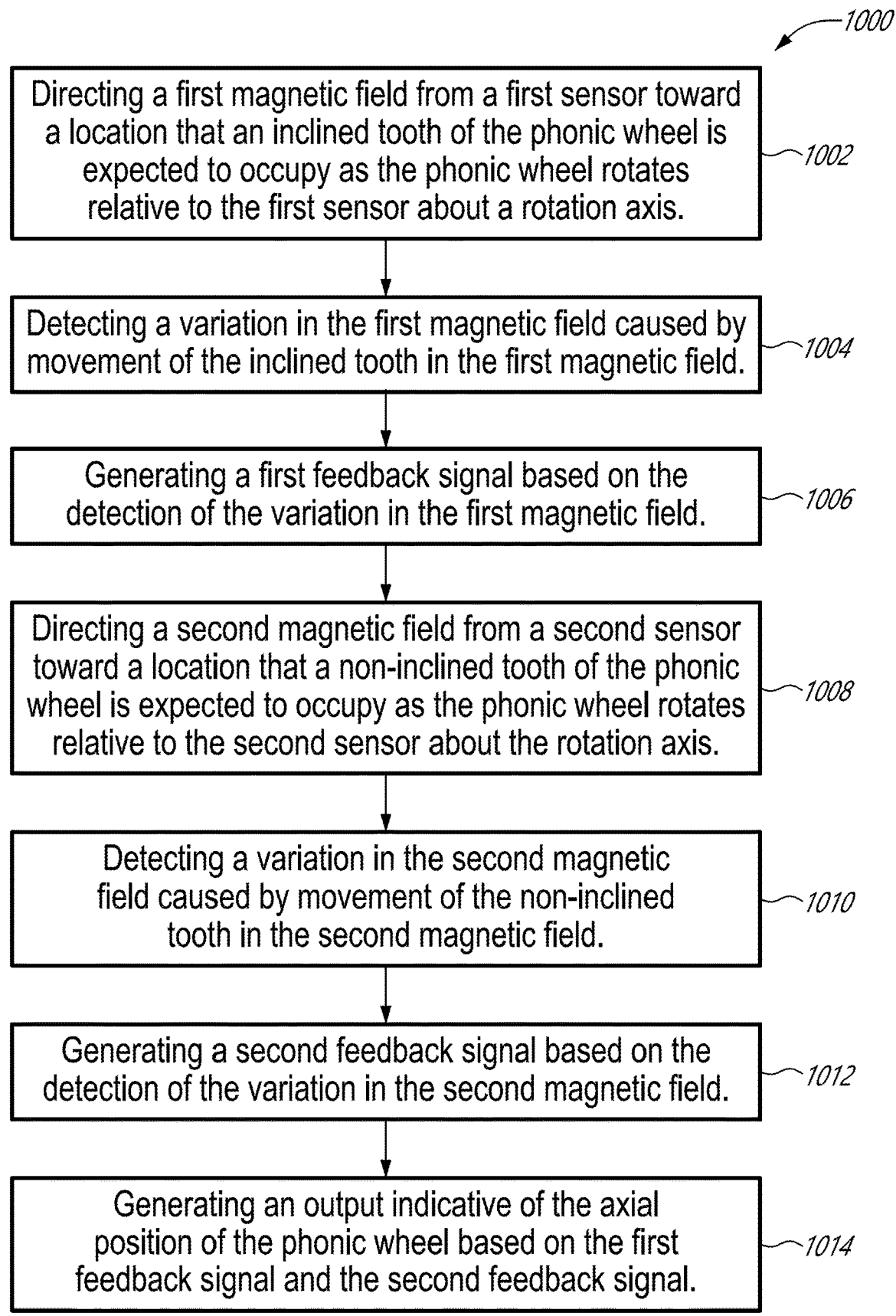
FIG. 6 is a flow diagram of an exemplary method for measuring an axial position of a phonic wheel.

FIG. 6 is a flow diagram of an exemplary method 1000 for measuring an axial position of phonic wheel 38, 138. Method 100 may be performed using system 36 described herein or using other system(s). For example, computer 42 may be configured to perform at least part of method 1000. Aspects of method 1000 may be combined with aspects of other methods or actions described herein. Method 1000 may include elements of system 36. In various embodiments, method 1000 may include:

- directing a first magnetic field from inclined sensor 40A toward a location that inclined tooth 44A, 144A of phonic wheel 38, 138 is expected to occupy as phonic wheel 38, 138 rotates relative to inclined sensor 40A about rotation axis RA, inclined tooth 44A, 144A extending axially relative to rotation axis RA and having an axially non-uniform height, inclined sensor 40A being inclined relative to orientation P perpendicular to rotation axis RA (block 1002);
- detecting a variation in the first magnetic field caused by movement of inclined tooth 44A, 144A in the first magnetic field (block 1004);
- generating a first feedback signal (e.g., positioning sensor signal 50A) based on the detection of the variation in the first magnetic field (block 1006);
- directing a second magnetic field from reference sensor 40B toward a location that reference tooth 44B, 144B of phonic wheel 38, 138 is expected to occupy as phonic wheel 38, 138 rotates relative to reference sensor 40B about rotation axis RA, reference tooth 44B, 144B extending axially relative to rotation axis RA and having an axially uniform height (block 1008);
- detecting a variation in the second magnetic field caused by movement of (e.g., non-inclined) reference tooth 44B, 144B in the second magnetic field (block 1010);
- generating a second feedback signal (e.g., reference sensor signal 50B) based on the detection of the variation in the second magnetic field (block 1012); and
- generating an output indicative of the axial position 54 of phonic wheel 38, 138 based on the first feedback signal and the second feedback signal (block 1014).

In some embodiments, method 1000 may include:

- directing the second magnetic field from reference sensor 40B toward a location that reference tooth 44C, 144C of phonic wheel 38, 138 is expected to occupy as phonic wheel 38, 138 rotates relative to reference sensor 40B about rotation axis RA, reference tooth 44C, 144C extending axially relative to rotation axis RA and having an axially uniform height different from the height of reference tooth 44B, 144B;
- detecting a variation in the second magnetic field caused by movement of reference tooth 44C, 144C in the second magnetic field;
- generating a third feedback signal (e.g., reference sensor signal 50C) based on the detection of the variation in the second magnetic field caused by movement of reference tooth 44C, 144C in the second magnetic field; and
- generating the output indicative of the axial position 54 of phonic wheel 38, 138 based on the first feedback signal, the second feedback signal and the third feedback signal.

Further aspects of method 1000 are described below in relation to FIGS. 7-9.

Figure 7:
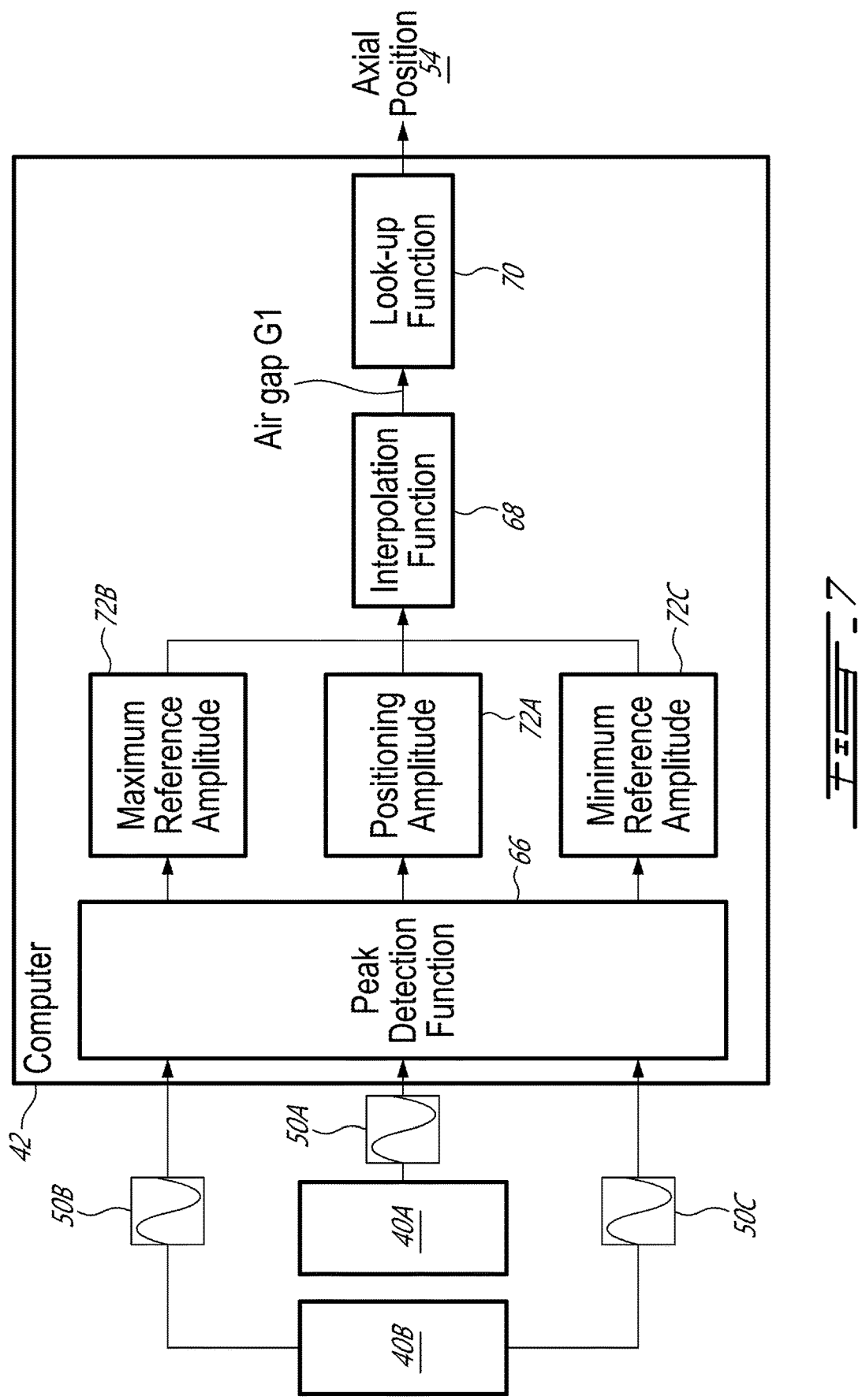
FIG. 7 is another flow diagram of the method for measuring the axial position of the phonic wheel.

FIG. 7 is a flow diagram illustrating aspects of method 1000. FIG. 7 illustrates an embodiment where two reference teeth 44B, 44C, 144B, 144C are used but embodiments of method 1000 may use only one reference tooth 44B, 44C, 144B, 144C. During a revolution of phonic wheel 38, 138, computer 42 may receive reference sensor signals 50B, 50C instantaneously generated by reference sensor 40B from the passing of reference teeth 44B, 44C, 144B, 144C by reference sensor 40B. During the same or other revolution of phonic wheel 38, 138, computer 42 may also receive positioning sensor signal 50A instantaneously generated by inclined sensor 40A from the passing of inclined tooth 44A by inclined sensor 40A. Sensor signals 50A-50C may be time-varying voltages having a sinusoidal shape for example. Peak detection function 66 may process sensor signals 50A, 50B, 50C and output respective (e.g., peak to peak or root-mean-square (RMS)) amplitudes of sensor signals 50A-50C. Based on the known relative positioning (i.e., known sequence on phonic wheel 38, 138) of inclined tooth or teeth 44A, 144A and reference tooth or teeth 44B, 44C, 144B, 144C and the amplitudes detected, peak detection function 66 may discriminate sensor signals 50A-50C. Specifically, positioning sensor signal 50A associated with inclined tooth 44A, 144A may be processed to obtain positioning amplitude 72A, reference sensor signal 50B associated with reference tooth 44B, 144B may be processed to obtain maximum reference amplitude 72B, and reference sensor signal 50C associated with reference tooth 44C, 144C may be processed to obtain minimum reference amplitude 72C.

Amplitudes 72A-72C may then be provided to interpolation function 68, which may be used to determine air gap G1 between inclined sensor 40A and inclined tooth 44A, 144A. Using look-up function 70, a corresponding axial position 54 of phonic wheel 38, 138 may be associated with air gap G1.

Figure 8:
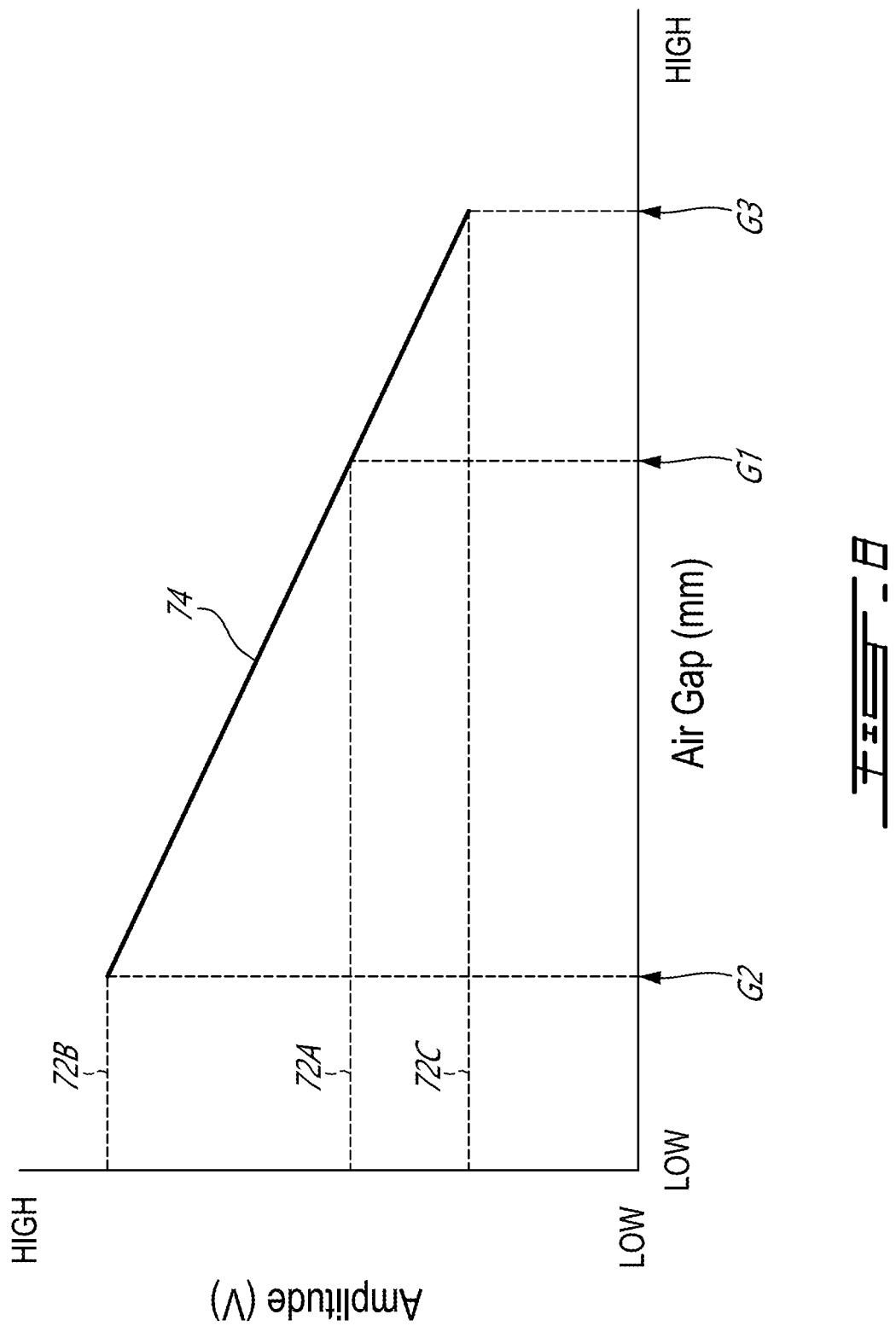
FIG. 8 is a graph illustrating an exemplary relationship between an amplitude of a sensor signal and an air gap between the sensor and a top of a tooth of the phonic wheel.

FIG. 8 is a graph of a relationship 74 between the amplitudes 72A-72B of sensor signals 50A-50C and corresponding air gaps G1, G2, G3. Relationship 74 is shown as being linear for the sake of clarity but relationship 74 may be non-linear (e.g., semi-logarithmic). Maximum reference amplitude 72B and minumum reference amplitude 72C may be associated with respective predetermined values of air gaps G2 and G3 that may be stored in memory 64 of computer 42. For example, values of air gaps G2 and G3 may have been determined during a design stage of system 36 or during an installation or setup of system 36. Method 1000 may include associating maximum reference amplitude 72B of reference sensor signal 50B to reference air gap G2 and associating minimum reference amplitude 72C of reference signal 50C to reference air gap G3. With relationship 74, interpolation may then be used to determine air gap G1 between inclined tooth 44A, 144A and inclined sensor 40A between reference air gaps G2 and G3 based on positioning amplitude 72A. In some embodiments, determining the value of air gap G1 may be done by solving an equation defining relationship 74 using positioning amplitude 72A, maximum reference amplitude 72B and/or minimum reference amplitude 72C.

In some embodiments, the amplitudes 72A-72C of sensor signals 50A-50C may depend on rotational speed 56. However since reference sensor signals 50B, 50C respectively associated with known air gaps G2, G3 are acquired together with positioning signal 50A, rotational speed 56 may not need to be known to determine air gap G1. Since all sensor signals 50A-50C may be acquired at the same rotational speed of phonic wheel 38, 138, interpolation may be used to determine air gap G1 without the need of rotational speed 56. In other words, determining air gap G1 may include comparing positioning sensor signal 50A with one or more of reference sensor signals 50B, 50C. For example, positioning amplitude 72A may be compared to maximum reference amplitude 72B and/or to minimum reference amplitude 72C to determine air gap G1 in relation to one or both of reference air gaps G2 and G3.

For example, even though FIG. 8 illustrates an interpolation between maximum reference amplitude 72B and minimum reference amplitude 72C to determine air gap G1, a single reference amplitude may be sufficient to determine air gap G1 with the knowledge of relationship 74 by comparison of positioning amplitude 72A with the single reference amplitude.

FIG. 9 is a table defining a relationship between values (e.g., GAP1-GAP6) of air gap G1, values (e.g., A1-A6) of axial position 54 of phonic wheel 38, 138 and optionally values (e.g., P1-P6) of pitch angle 52 of bladed rotor 32. Look-up function 70 may use a look-up table or other relationship to associate (relate) air gap G1 to axial position 54 of phonic wheel 38, 138. Look-up function 70 may instead or in addition relate air gap G1 to pitch angle 52 of bladed rotor 32. Look-up function 70 may relate axial position 54 of phonic wheel 38, 138 to pitch angle 52 of blades 32 of bladed rotor 12.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

What is claimed is:

1. A system for measuring an axial position of a phonic wheel, the system comprising:
   the phonic wheel rotatable about a rotation axis and translatable along the rotation axis, the phonic wheel including:
   a body;
   an inclined tooth attached to the body and extending axially, a top surface of the inclined tooth being inclined relative to the rotation axis; and
   a reference tooth attached to the body and extending axially, a top surface of the reference tooth being parallel to the rotation axis;
   an inclined sensor adjacent the phonic wheel and configured to generate a positioning signal indicative of a gap between the top surface of the inclined tooth and the inclined sensor along a sensor axis of the inclined sensor as the phonic wheel is rotated relative to the inclined sensor, the sensor axis of the inclined sensor being non-perpendicular to the rotation axis;
   a reference sensor adjacent the phonic wheel and configured to generate a reference signal indicative of a gap between the top surface of the reference tooth and the reference sensor along a sensor axis of the reference sensor as the phonic wheel is rotated relative to the reference sensor, the sensor axis of the reference sensor being perpendicular to the rotation axis; and
   a computer operatively connected to the inclined sensor and to the reference sensor, the computer being configured to generate an output indicative of the axial position of the phonic wheel based on the positioning signal and the reference signal.

2. The system as defined in claim 1, wherein:
   the top surface of the inclined tooth is linearly sloped over an axial distance of the inclined tooth; and
   the sensor axis of the inclined sensor is perpendicular to the top surface of the inclined tooth.

3. The system as defined in claim 1, wherein the computer is configured to:
   based on a comparison of the positioning signal to the reference signal, determine the gap between the top surface of the inclined tooth and the inclined sensor; and
   associate the gap between the top surface of the inclined tooth and the inclined sensor to the axial position of the phonic wheel.

4. The system as defined in claim 1, wherein:
   the top surface of the inclined tooth has a minimum radial height from the rotation axis corresponding to a first axial position for the phonic wheel, and a maximum radial height from the rotation axis corresponding to a second axial position for the phonic wheel; and
   the top surface of the reference tooth is at the minimum radial height from the rotation axis or at the maximum radial height from the rotation axis.

5. The system as defined in claim 4, wherein:
   the reference tooth is a first reference tooth, the top surface of the first reference tooth being at the minimum radial height from the rotation axis; and
   the phonic wheel includes a second reference tooth attached to the body and extending axially, a top surface of the second reference tooth being parallel to the rotation axis and at the maximum radial height from the rotation axis.

6. The system as defined in claim 5, wherein:
   the reference signal is a first reference signal;
   the reference sensor is configured to generate a second reference signal indicative of a gap between the top surface of the second reference tooth and the reference sensor along the sensor axis of the reference sensor as the phonic wheel is rotated relative to the reference sensor; and
   the computer is configured to generate the output indicative of the axial position of the phonic wheel based on the positioning signal, the first reference signal and the second reference signal.

7. The system as defined in claim 6, wherein the computer is configured to:
   based on a comparison of an amplitude of the positioning signal to an amplitude of the first reference signal and to an amplitude of the second reference signal, determine the gap between the top surface of the inclined tooth and the inclined sensor; and
   use the gap between the top surface of the inclined tooth and the inclined sensor to determine the axial position of the phonic wheel.

8. The system as defined in claim 6, wherein the computer is configured to:
associate an amplitude of the first reference signal to a first reference gap value;
associate an amplitude of the second reference signal to a second reference gap value; and
use interpolation to determine the gap between the top surface of the inclined tooth and the inclined sensor between the first reference gap value and the second reference gap value using an amplitude of the positioning signal.

9. The system as defined in claim 1, wherein a surface of the body adjacent the inclined tooth is parallel to the rotation axis so that the inclined tooth has an axially non-uniform radial height from the surface of the body.

10. The system as defined in claim 1, wherein a surface of the body adjacent the inclined tooth is axially inclined relative to the rotation axis so that the inclined tooth has an axially uniform radial height from the surface of the body.

11. The system as defined in claim 1, wherein the inclined sensor and the reference sensor are both variable reluctance sensors.

12. An aircraft engine comprising:
a bladed rotor rotatable about a rotation axis and having pitch-adjustable blades;
a toothed ring coaxial with the rotation axis, the toothed ring including:
an inclined tooth extending axially relative to the rotation axis and having an axially non-uniform radial height; and
a reference tooth extending axially relative to the rotation axis and having an axially uniform radial height;
an inclined sensor adjacent to the toothed ring, the toothed ring being rotatable about the rotation axis and translatable axially along the rotation axis as a function of a pitch angle of the pitch-adjustable blades, the inclined sensor being configured to generate a positioning signal indicative of a gap between the inclined tooth and the inclined sensor along a sensor axis of the inclined sensor as rotation of the toothed ring relative to the inclined sensor occurs, the sensor axis of the inclined sensor being perpendicular to a top surface of the inclined tooth;
a reference sensor fixedly mounted relative to the inclined sensor and adjacent to the toothed ring, the reference sensor being configured to generate a reference signal indicative of a gap between the reference tooth and the reference sensor along a sensor axis of the reference sensor as rotation of the toothed ring relative to the reference sensor occurs, the sensor axis of the reference sensor being perpendicular to the rotation axis; and
a computer operatively connected to the inclined sensor and to the reference sensor, the computer being configured to generate an output indicative of a relative axial position between the toothed ring and the inclined sensor based on the positioning signal and the reference signal.

13. The aircraft engine as defined in claim 12, wherein the inclined sensor is disposed radially outwardly of the toothed ring.

14. The aircraft engine as defined in claim 12, wherein:
the top surface of the inclined tooth has a minimum radial height from the rotation axis and a maximum radial height from the rotation axis; and
a top surface of the reference tooth is at the minimum radial height from the rotation axis or at the maximum radial height from the rotation axis.

15. The aircraft engine as defined in claim 14, wherein:
the reference tooth is a first reference tooth, the top surface of the first reference tooth being at the minimum radial height from the rotation axis; and
the toothed ring includes a second reference tooth extending axially relative to the rotation axis, the second reference tooth having an axially uniform radial height at the maximum radial height from the rotation axis.

16. The aircraft engine as defined in claim 15, wherein:
the reference signal is a first reference signal;
the reference sensor is configured to generate a second reference signal indicative of a gap between the second reference tooth and the reference sensor along the sensor axis of the reference sensor as rotation of the toothed ring relative to the reference sensor occurs; and
the computer is configured to generate the output indicative of the relative axial position between the toothed ring and the inclined sensor based on the positioning signal, the first reference signal and the second reference signal.

17. The aircraft engine as defined in claim 16, wherein the computer is configured to:
associate an amplitude of the first reference signal to a first reference gap value;
associate an amplitude of the second reference signal to a second reference gap value; and
use interpolation to determine the gap between the inclined tooth and the inclined sensor between the first reference gap value and the second reference gap value using an amplitude of the positioning signal.

18. The aircraft engine as defined in claim 17, wherein a surface of the toothed ring adjacent the inclined tooth is axially inclined relative to the rotation axis so that the inclined tooth has an axially uniform radial height from the surface of the toothed ring.

19. A method for measuring an axial position of a phonic wheel, the method comprising:
directing a first magnetic field from a first sensor toward a location that a first tooth of the phonic wheel is expected to occupy as the phonic wheel rotates about a rotation axis relative to the first sensor, the first tooth extending axially relative to the rotation axis and having an axially non-uniform radial height, the first sensor being inclined relative to an orientation perpendicular to the rotation axis;
detecting a variation in the first magnetic field caused by movement of the first tooth in the first magnetic field;
generating a first feedback signal based on the detection of the variation in the first magnetic field;
directing a second magnetic field from a second sensor toward a location that a second tooth of the phonic wheel is expected to occupy as the phonic wheel rotates relative to the second sensor about the rotation axis, the second tooth extending axially relative to the rotation axis and having an axially uniform radial height;
detecting a variation in the second magnetic field caused by movement of the second tooth in the second magnetic field;
generating a second feedback signal based on the detection of the variation in the second magnetic field; and
generating an output indicative of the axial position of the phonic wheel based on the first feedback signal and the second signal.

20. The method as defined in claim 19, comprising:
directing the second magnetic field from the second sensor toward a location that a third tooth of the phonic wheel is expected to occupy as the phonic wheel rotates relative to the second sensor about the rotation axis, the third tooth extending axially relative to the rotation axis and having an axially uniform radial height different from the radial height of the second tooth;
detecting a variation in the second magnetic field caused by movement of the third tooth in the second magnetic field;
generating a third feedback signal based on the detection of the variation in the second magnetic field caused by movement of the third tooth in the second magnetic field; and
generating the output indicative of the axial position of the phonic wheel based on the first feedback signal, the second feedback signal and the third feedback signal.

\* \* \* \* \*